(12) United States Patent
Chalifoux (10) Patent No.: US 8,573,410 B2
(45) Date of Patent: Nov. 5, 2013

(54) COLLAPSIBLE DISH DRYING RACK

(76) Inventor: Paul R. Chalifoux, Wellesley, MA (US)

( * ) Notice: Subject to any disclaimer, the term of this patent is extended or adjusted under 35 U.S.C. 154(b) by 127 days.

(21) Appl. No.: 13/317,699

(22) Filed: Oct. 26, 2011

(65) Prior Publication Data

US 2013/0105423 A1  May 2, 2013

(51) Int. Cl.
*A47G 19/08* (2006.01)
(52) U.S. Cl.
USPC .......................................................... 211/41.5
(58) Field of Classification Search
USPC .............. 211/4.4, 41.3, 41.2, 41.11, 2, 1, 1.3, 211/133.5
See application file for complete search history.

(56) References Cited

U.S. PATENT DOCUMENTS

| | | | | |
|---|---|---|---|---|
| 815,480 A * | 3/1906 | Silven | | 248/455 |
| 1,564,594 A * | 12/1925 | Leh | | 248/448 |
| 1,714,629 A * | 5/1929 | Rodin | | 211/195 |
| 2,443,404 A * | 6/1948 | Tallarico | | 211/41.4 |
| 2,479,118 A * | 8/1949 | Jenness | | 211/41.5 |
| 2,931,514 A * | 4/1960 | Hughes | | 211/41.4 |
| 2,958,424 A * | 11/1960 | Bigatti | | 211/41.5 |
| 5,503,279 A * | 4/1996 | Wentworth | | 211/175 |
| 6,170,676 B1 * | 1/2001 | Patadia et al. | | 211/41.6 |
| 6,516,956 B2 * | 2/2003 | Martorella et al. | | 211/41.6 |
| 7,455,184 B2 * | 11/2008 | Yang et al. | | 211/41.4 |
| 2007/0151937 A1 * | 7/2007 | Gillisie | | 211/41.5 |
| 2008/0283480 A1 * | 11/2008 | Segall et al. | | 211/41.6 |

* cited by examiner

*Primary Examiner* — Jose V Chen
(74) *Attorney, Agent, or Firm* — Bay State IP, LLC (57) ABSTRACT

A collapsible dish drying rack is provided. A plurality of shaped wires is rotatably mounted on two arms attached to a pivotable first wire support members and on a second wire support member. The first wire support member is pivoted upwardly to raise the shaped wires and pivoted downwardly to lower the shaped wire thereby to position the wires between the wire support members in a relatively flat position. An outside surface of the pivotable first support member can function as a cutting board.

14 Claims, 10 Drawing Sheets

COLLAPSIBLE DISH DRYING RACK

BACKGROUND OF THE INVENTION

This invention relates to a collapsible dish drying rack and in one embodiment, a combination collapsible dish drying rack and cutting board.

In the past, dish drying racks and cutting boards have been separate units. Cutting boards are normally comprised of a rectangular piece of wood or plastic having a horizontal cutting surface. The surface must be of relatively high strength, such that it can withstand the downward forces of a cutting utensil. Thus, such cutting boards are designed to lay flat on a counter top or the like. After use of the cutting board is completed, it is washed and then stored to free up kitchen counter space for some other use.

Generally, dish drying racks are made of plastic or plastic coated metal wires that can be configured to hold dishes, glasses and cups. The drying rack is placed on a drain board made of flexible plastic or rubber-like material having a drain surface which directs the run-off into a sink for disposal. After use of the drying rack is completed, it is usually stored in order to free up counter space adjacent the sink.

It would be desirable to minimize use of counter spacer when using a cutting board and a dish drying rack in order to provide additional counter space availability for other normal kitchen activities such as food preparation.

SUMMARY OF THE INVENTION

In accordance with this invention, a collapsible dish drying rack is provided. The dish drying rack comprises a plurality of bent wires shaped to accommodate dishes and containers for liquid such as glasses or cups or silverware. The wires are rotatably mounted on arms which extend from a first support member and on a second wire support member. The first wire support member is pivotally mounted with respect to the second wire support member so that the wires can be raised above the surface of the second wire support member and subsequently can be lowered so that they lie substantially flat between the two wire support members. The second wire support member can be an independent member or can comprise a portion of a kitchen counter.

DESCRIPTION OF SPECIFIC EMBODIMENTS

Figure 1:
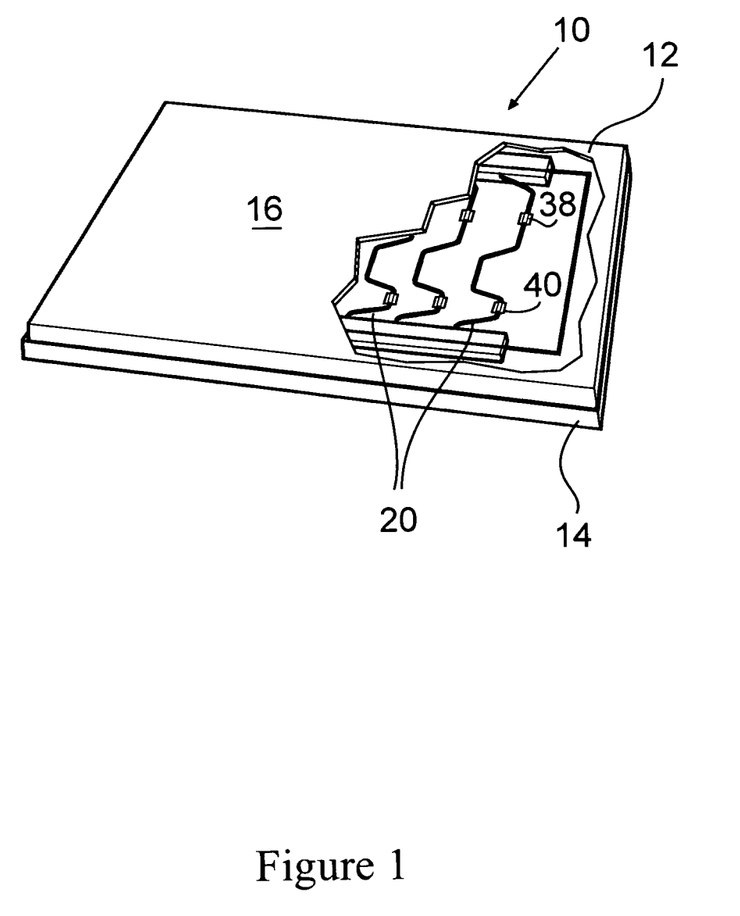
FIG. 1 is a partial cutaway view of the apparatus of this invention in a closed position.

Referring to FIG. 1, the combination dish rack and cutting board 10 of this invention can comprise two wire support members (boards) 12 and 14. Board 12 includes a substantially flat surface 16 which can function as a cutting board. The wire members rotatably mounted in tubes or clips or the like 38 and 40. Surface 16 can be a decorative surface if desired. The wire members 20 of a dish rack are positioned between wire support members 12 and 14 in a closed, relatively flat position. The wire support members can be made of metal, wood or plastic or the like. The wire members 20 are shaped so that they do not fold on each other at any point.

Figure 2:
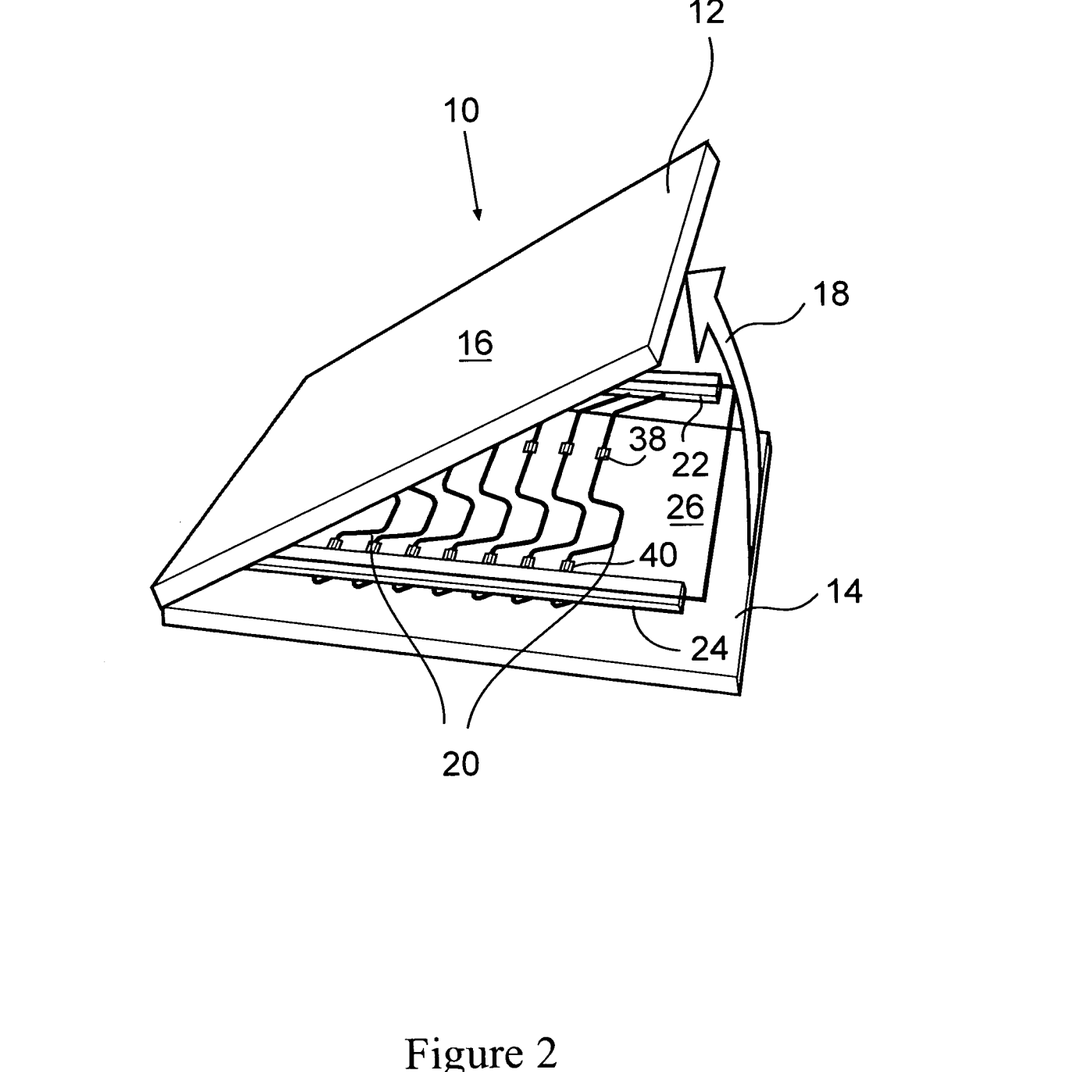
FIG. 2 is a side view of the apparatus of FIG. 1 in a partially open position.

Referring to FIG. 2, the apparatus of FIG. 1 is shown in partially open position by lifting wire support member 12 as indicated by arrow 18. The dish rack comprises a plurality of shaped wire members 20 that are rotatably mounted on arms 22 and 24 and can be rotatably mounted on surface 26 of support member 14.

Figure 3:
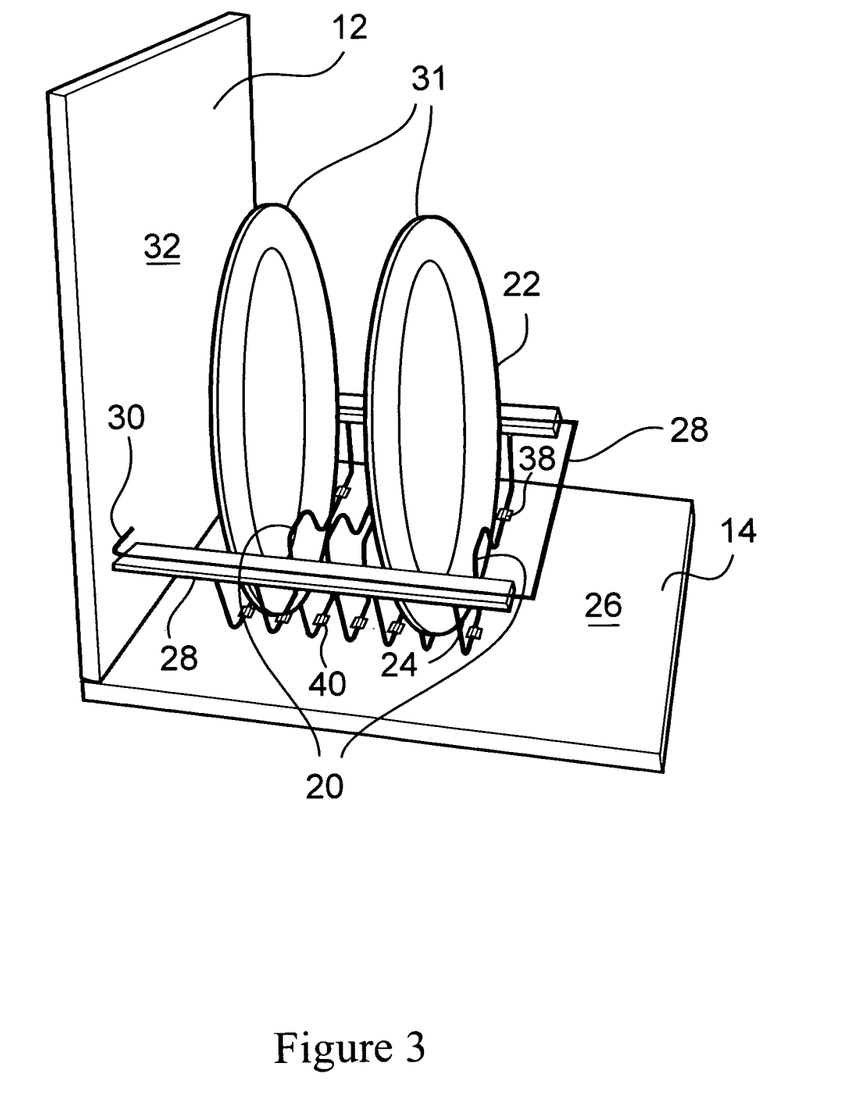
FIG. 3 is a side view of the apparatus of FIG. 1 in the fully open position.
Figure 4:
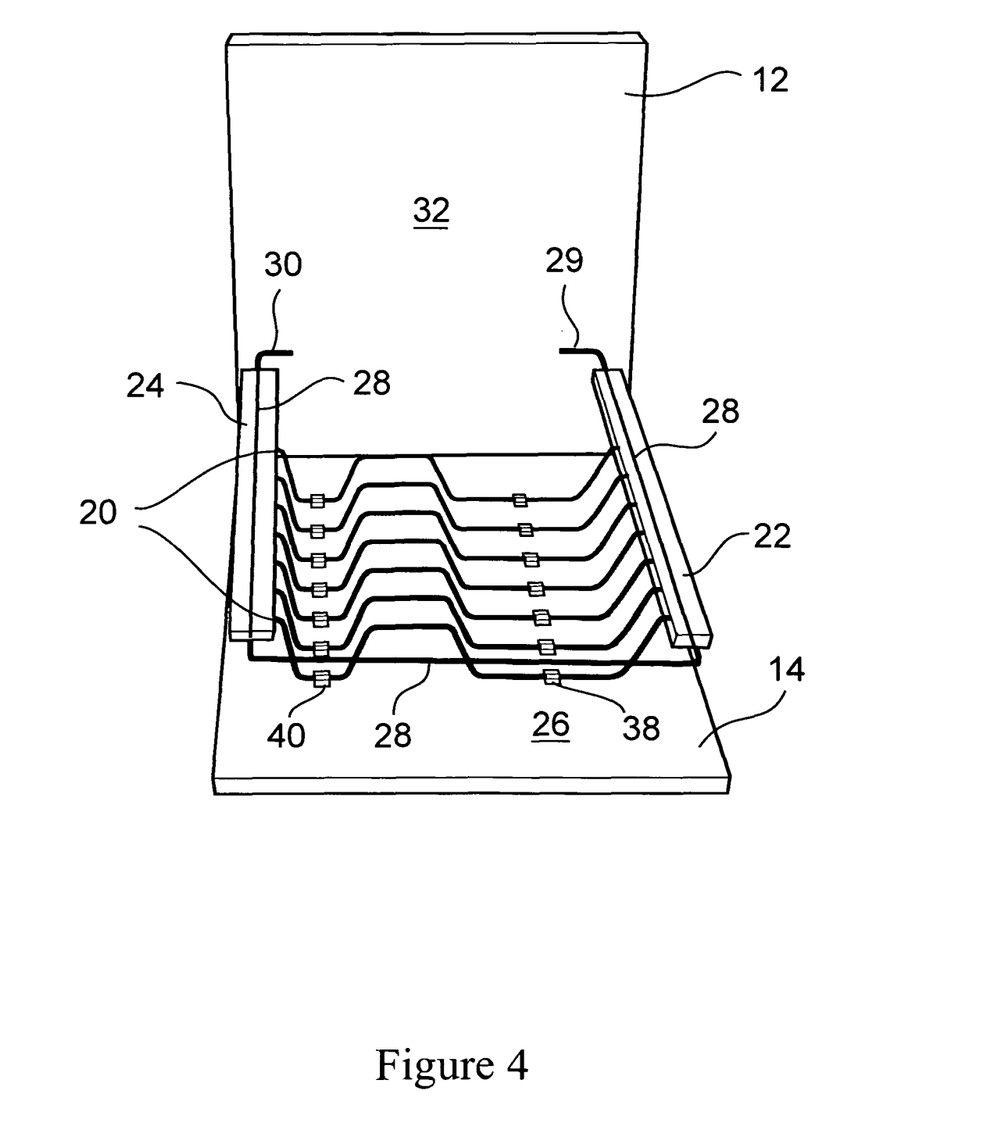
FIG. 4 is a front view of the apparatus of FIG. 3.

Referring to FIGS. 3 and 4, the apparatus of this invention 10 is shown in the fully open position wherein board 12 is in a substantially vertical position. As shown in FIG. 3, arms 22 and 24 are attached to wire 28. Wire 28 is rotatably mounted at each end, 29 and 30 on surface 32 of board 12. The dishes 31 are in a substantially vertical position when they are drying.

Figure 5:
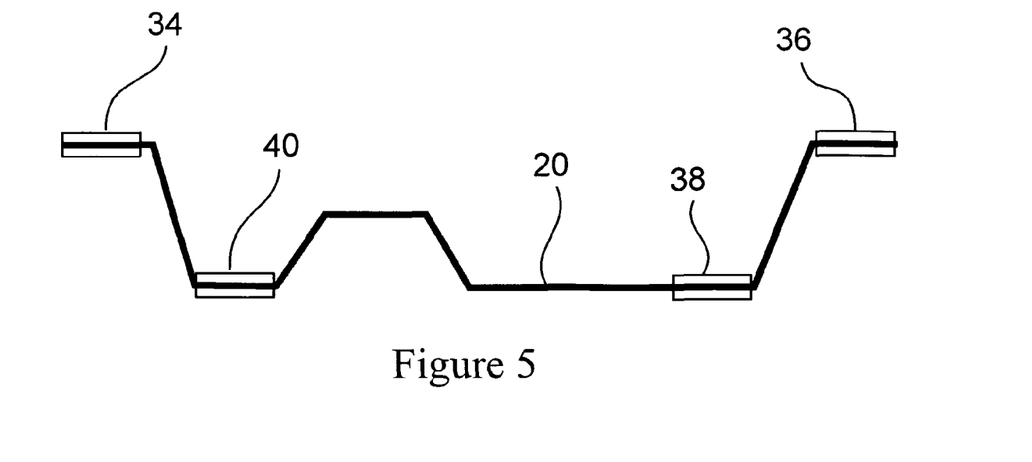
FIG. 5 is a side view of the wires of the apparatus of this invention within their mountings.
Figure 6:
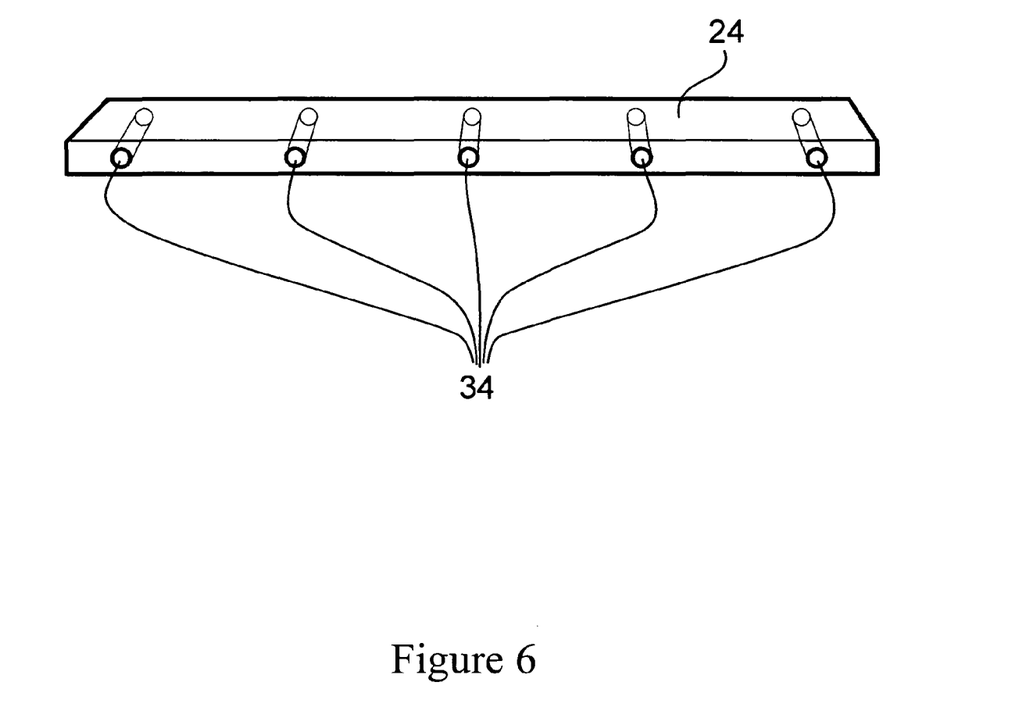
FIG. 6 is a side view of the mounting arm for the wires of the apparatus of this invention.
Figure 7:
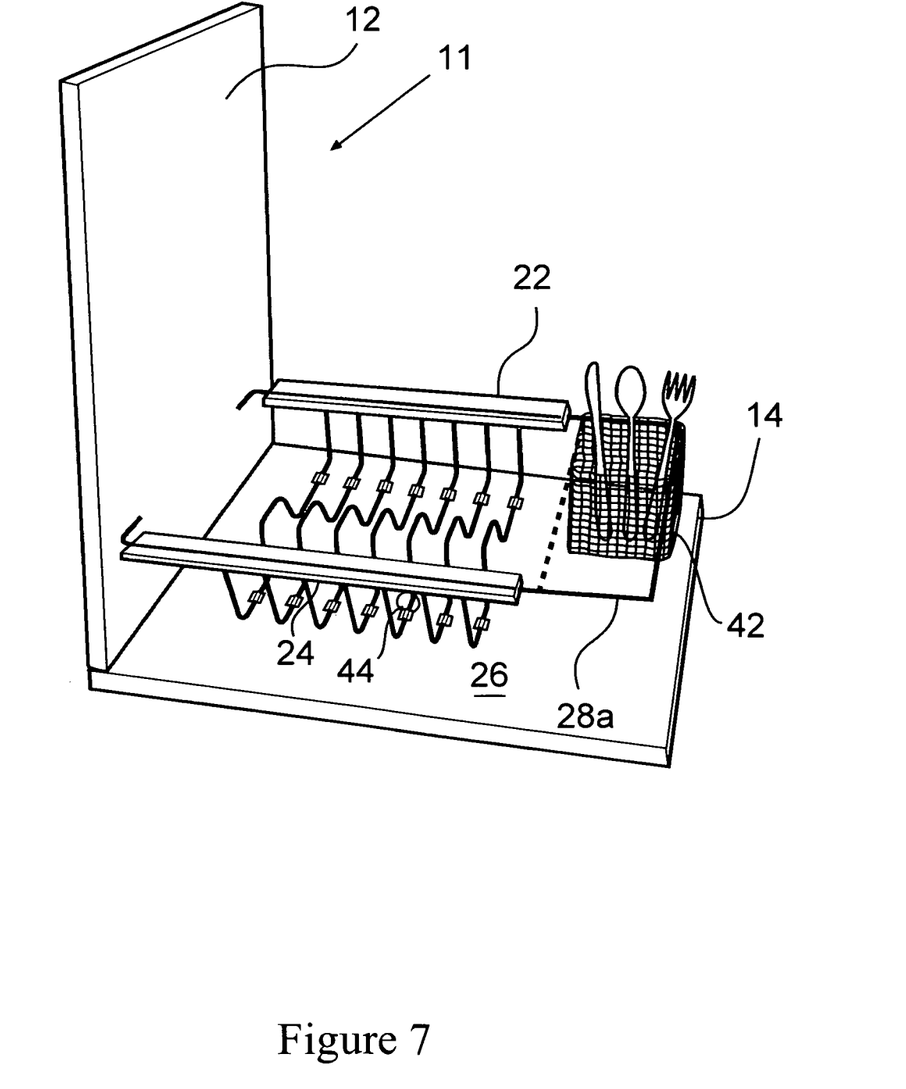
FIG. 7 shows an alternative embodiment of this invention.

Referring to FIGS. 5 and 6 of the wires 20 is rotatably mounted on arms 22 and 24 such as by positioning them within tubes 34 and 36. The wires 20 also can be positioned within tubes 38 and 40 which can be open to accommodate the wires 20 and closed to retain the wires. Tubes 38 and 40 can be replaced by clips or the like to permit wires 20 to rotate therein Referring to FIG. 7, the apparatus of this invention can include a utensil container 42 which can have a collapsible construction such as a collapsible bag made of plastic, cloth or metal or the like having a mesh like quality that allows water to drip through it. It can be removable for cleaning. Wire 28a can be extended to permit access to the container 42. The surface 26 also can be provided with a drain hole 44 which connects to a nearby sink (not shown).

Figure 8:
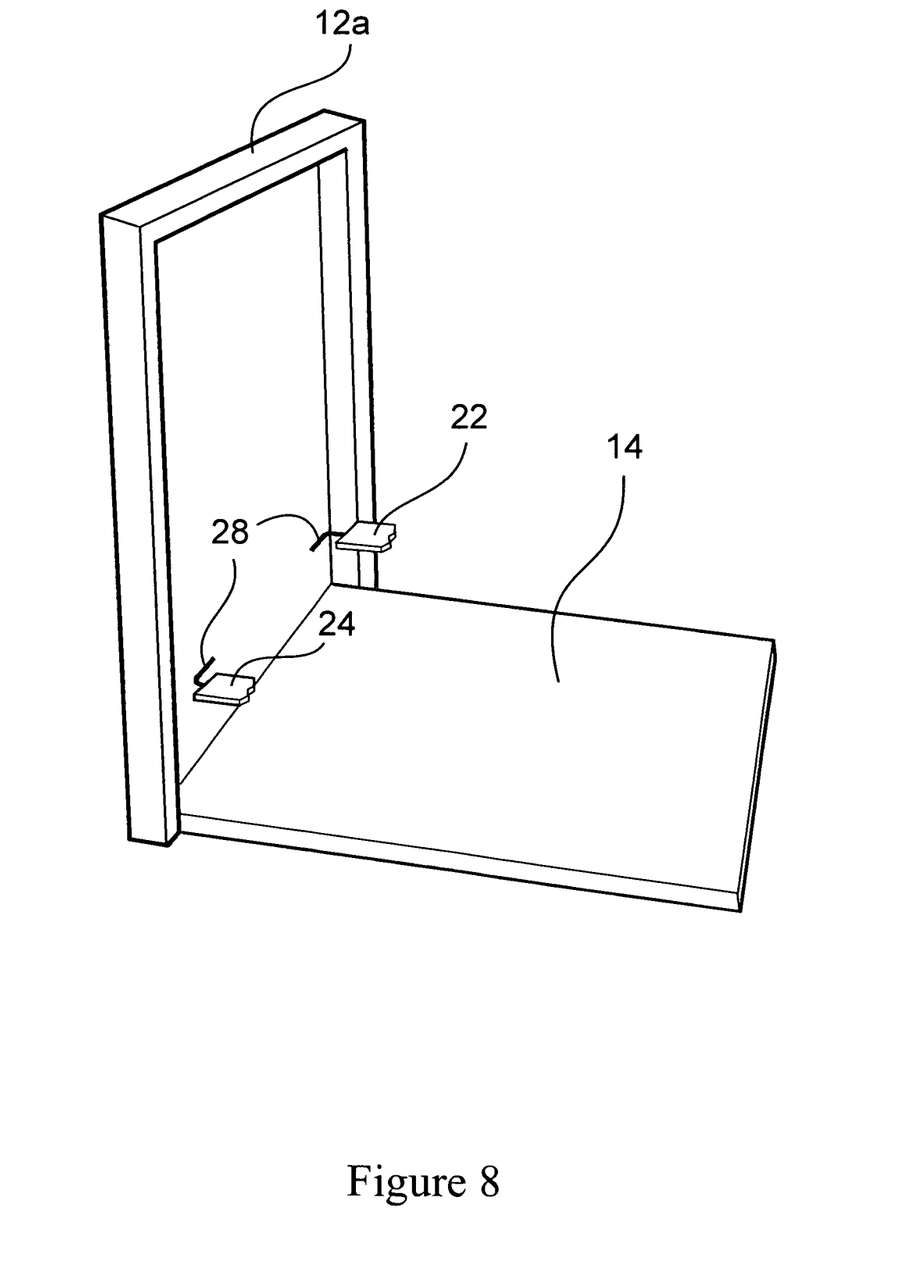
FIG. 8 shows an alternative structure containing the top surface to which the support arms for the wire can be attached.

Referring to FIG. 8, wire support member (board) 12 (FIG. 2) can be replaced by a box structure 12a to which are attached wire support member 28 and arms 22 and 24.

Figure 9:
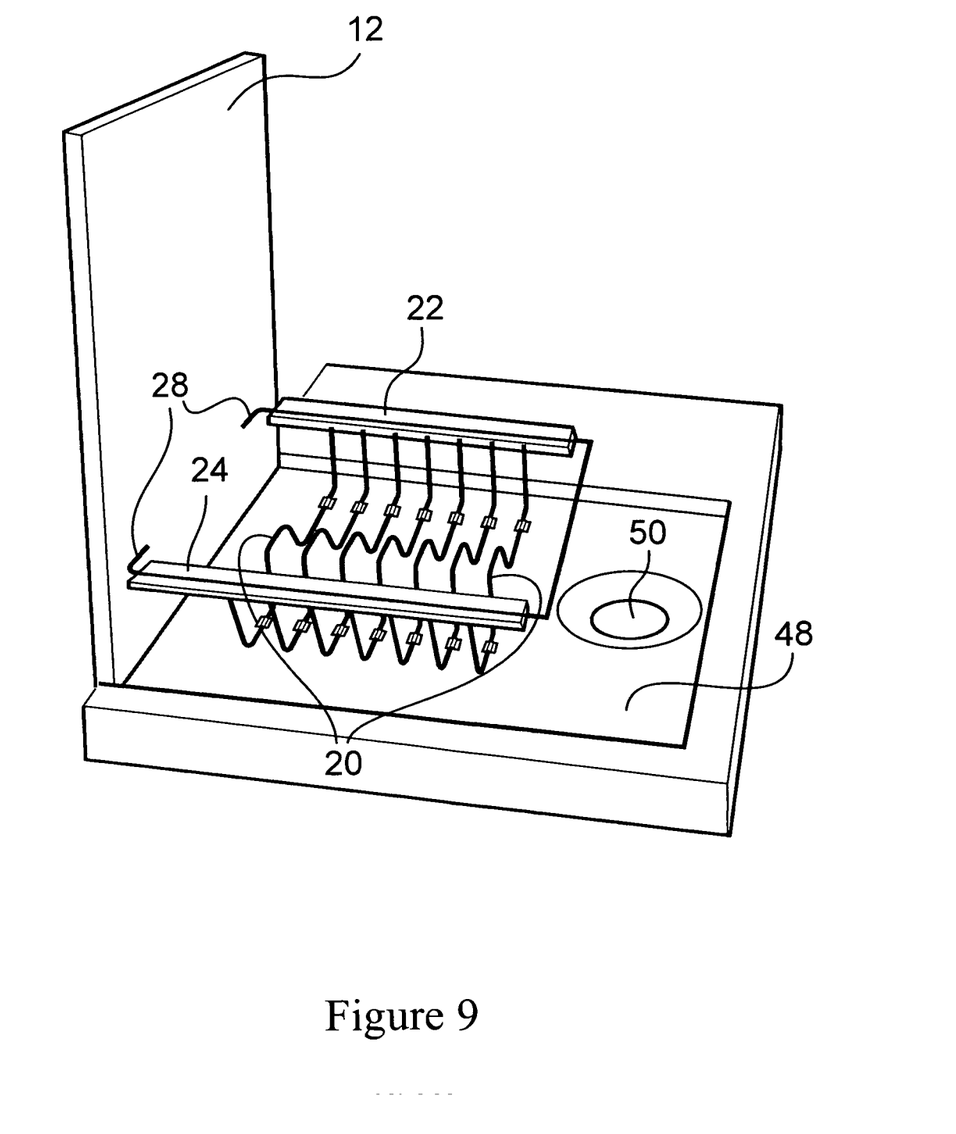
FIG. 9 shows an alternative embodiment of this invention wherein the wires are attached directly to a kitchen counter surface.

Referring to FIG. 9 board, the board 14 of FIGS. 1-4 can be replaced by a a portion of the surface of a kitchen counter 48 onto which are positioned wires 20.

Surface 48 can be provided with a drain which is connected to a nearby sink (not shown). Surface 48 preferably is depressed from the surface of the kitchen counter so that when board 12 is closed, the outer surface of the board 12 is flush with the surrounding kitchen counter top surface.

Figure 10:
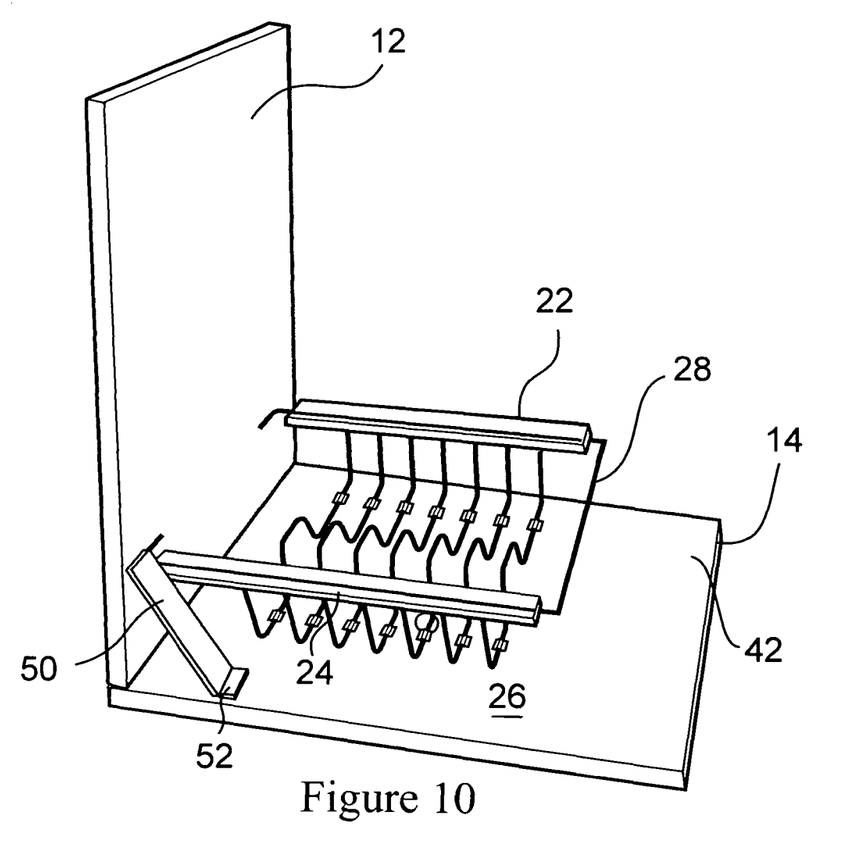
FIG. 10 is a perspective view of the apparatus of this invention with a support arm.
Figure 11:
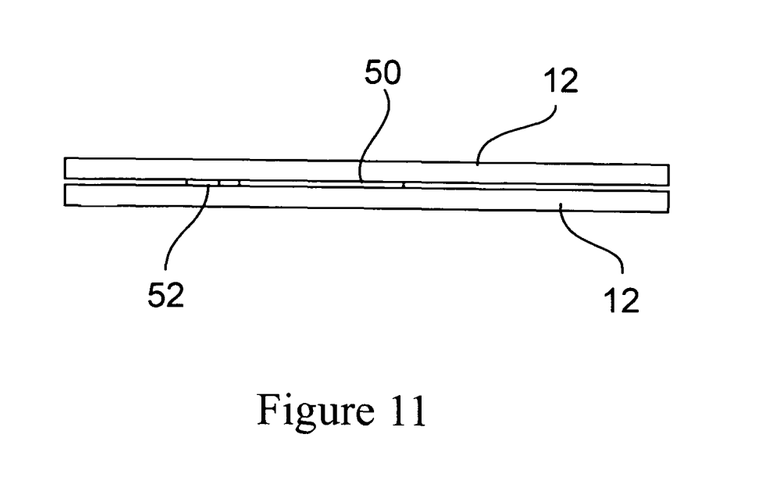
FIG. 11 is a side view of the apparatus of FIG. 10 in a closed position.

Referring to FIGS. 10 and 11, the apparatus of this invention is shown with a support arm 50 which prevents the wire support member 12 from closing after it has been open in order to protect dishes supported by the shaped wire members 20. The arm 50 is prevented from moving by a stop comprising a depression or extension 52 on wire support member 12. Arm 50 also can be a locking or lockable hinge. When it is desired to close wire support member 12, support arm 50 is lifted away from wire support member 14 and folded into the position shown in FIG. 11. If desired, the support arm and stop can be positioned at the forward surface 54 of arm 24.

Figure 12:
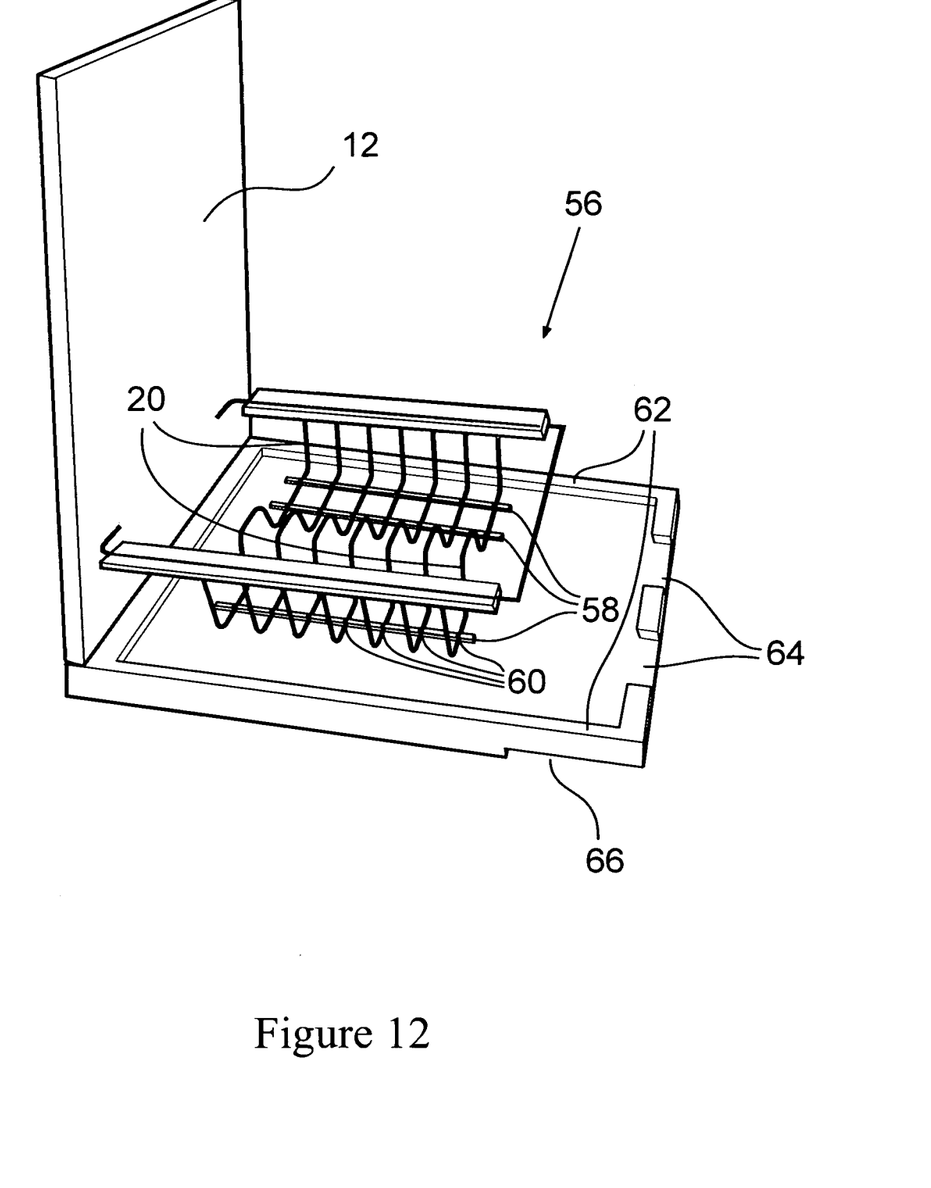
FIG. 12 is a side view of an alternative embodiment of this invention.

Referring to FIG. 12, the apparatus 56 of this invention can include supports 58 for wires 20 which includes slots 60 into which the wires 20 fit. Alternatively, holes can be used rather than the slots. The apparatus also can include elevated liquid barriers 62 to direct liquid to drainage areas 64. The apparatus 56 also can include a cutaway section 66 to allow placement of the apparatus 56 over a raised sink edge (not shown).

The invention claimed is:

1. A combination dish rack and cutting board comprising:
 a set of two support members comprising a first wire support member and a second wire support member;
 a pair of arms which extend from the first wire support member and on a second wire support member;
 a plurality of shaped wire members rotatably mounted on the pair of arms by positioning the plurality of shaped wire members within tubes located in the pair of arms and rotatably mounted on a surface of the second wire support member by positioning the plurality of shaped wire members within a set of tubes which open to accommodate the plurality of shaped wire members;
 wherein the first wire support member comprises a cutting board; and,
 wherein the plurality of shaped wire members of the dish rack are positioned between and enclosed within the first wire support member and the second wire support member.

2. The combination dish rack and cutting board of claim 1 further comprising a collapsible utensil container.

3. The combination dish rack and cutting board of claim 1 wherein a portion of the second wire support member is depressed into a kitchen counter.

4. The combination dish rack and cutting board of claim 1 wherein the second wire support member comprises a drain hole.

5. The combination dish rack and cutting board of claim 1 further comprising a support arm, wherein the support arm extends from the first wire support member to the second wire support member to prevent the first wire support member from closing after the first wire support member has been opened.

6. The combination dish rack and cutting board of claim 5 wherein the second wire support member further comprises a depression stop to prevent the support arm from moving.

7. The combination dish rack and cutting board of claim 5 wherein the upper second wire support member further comprises an extension stop to prevent the support arm from moving.

8. A kitchen accessory comprising:
 a box structure comprising an outer surface cutting board;
 wire support member;
 a pair of arms; and,
 a plurality of shaped wire members rotatably mounted on the pair of arms by positioning the plurality of shaped wire members within tubes located in the pair of arms and rotatably mounted on a surface of the wire support member by positioning the plurality of shaped wire members within a set of tubes which open to accommodate the plurality of shaped wire members; and,
 wherein the wire support member and the pair of arms are attached to an upper portion of the box structure in order to define a combination dish rack and cutting board.

9. The kitchen accessory of claim 8 further comprising a collapsible utensil container.

10. The kitchen accessory of claim 8 wherein a portion of the wire support member is depressed into a kitchen counter.

11. The kitchen accessory of claim 8 wherein the the wire support member comprises a drain hole.

12. The kitchen accessory of claim 1 further comprising a support arm, wherein the support arm extends from the box structure to the wire support member to prevent the box structure from closing after it has been opened.

13. The combination dish rack and cutting board of claim 12 wherein the wire support member further comprises a depression stop to prevent the support arm from moving.

14. The combination dish rack and cutting board of claim 12 wherein the wire support member further comprises an extension stop.

* * * * *